April 20, 1937.  R. M. GASTON  2,077,556
CHANGE GEAR
Filed May 11, 1935
Fig. 1
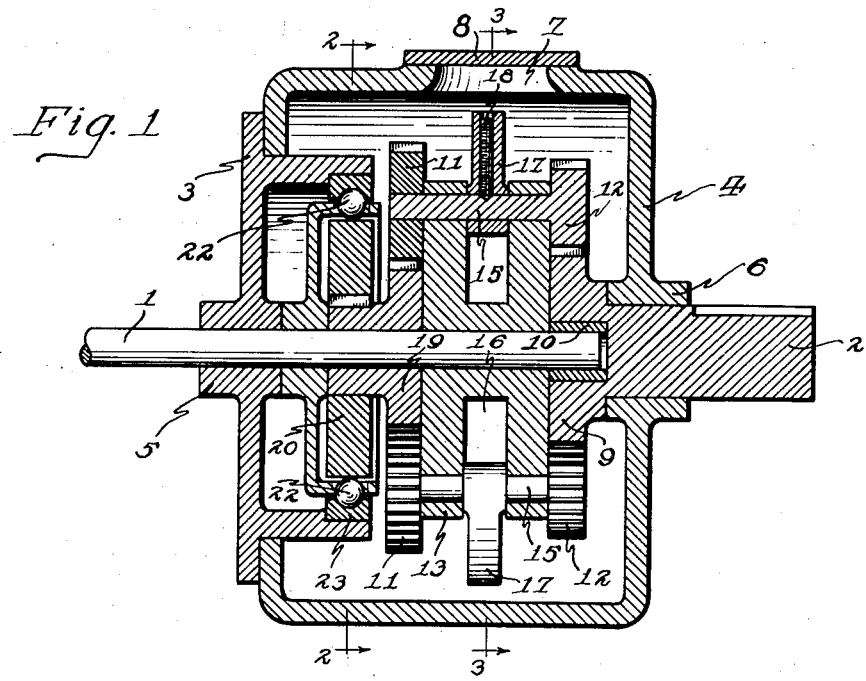
Fig. 2
Fig. 3
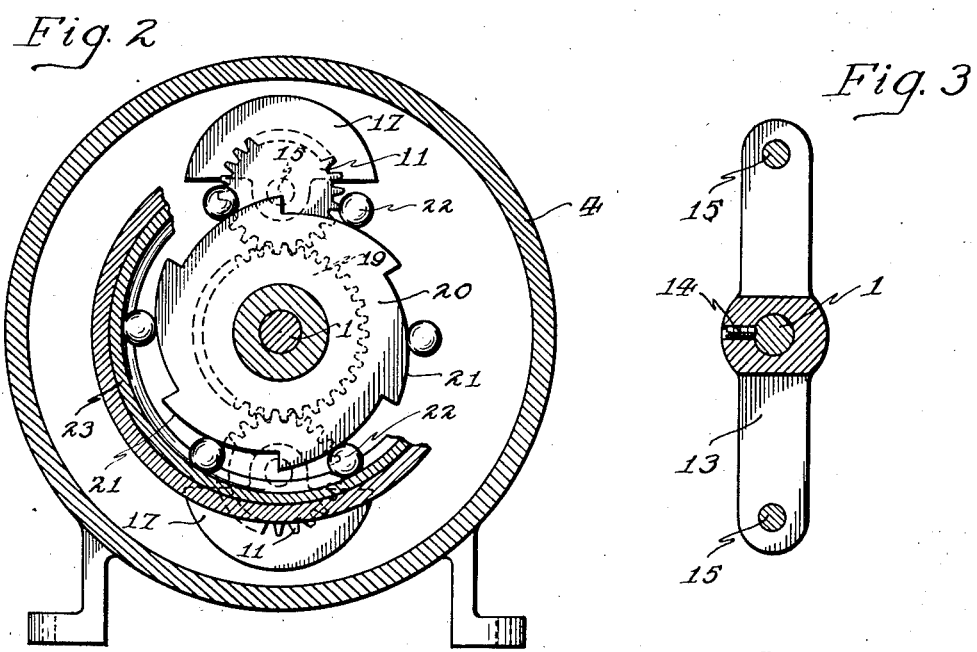
Inventor
Ralph M. Gaston,
by Rummler Rummler & Wadworth
Attys.

Patented Apr. 20, 1937

2,077,556

UNITED STATES PATENT OFFICE 2,077,556

CHANGE GEAR

Ralph M. Gaston, Chicago, Ill.

Application May 11, 1935, Serial No. 20,968

6 Claims. (Cl. 74—260)

This invention relates to gearing; and the purpose of the gearing is to afford a positive drive connection between a drive and a driven shaft at some fixed reduction of speed and to speed up the driven shaft to drive-shaft speed when the torque becomes lighter.

The construction is useful in connection with automatic gear-shifting devices operable according to the resistance of the driven load.

The term "automatic" in this connection means that differences in speed and torque between drive and driven shafts are obtained without manual manipulation of gear sets or gear-shifting devices.

The construction has a wide range of usefulness in machinery and conspicuously in hoists, boats and land vehicles.

The principal object of this invention is to provide a power transmitting mechanism which automatically transmits or multiplies drive shaft forces within a predetermined range in accordance with the load on the driven shaft. Other important objects, in order to make such a mechanism commercially successful, are simple, durable and practical construction, compact dimensions and proper performance.

The purposes of the invention are attained by the use of a construction as illustrated in the drawing, wherein:

Figure 1 is a longitudinal center sectional view of a gearing embodying this invention.

Fig. 2 is a transverse section of the gear unit as indicated by the line 2—2 of Fig. 1.

Fig. 3 is a sectional detail of a planetary pinion carrier as indicated by the line 3—3 of Figure 1.

Essentially this transmission is based on the effects of mass motion upon the actions of a planetary gear set. This gear set may be of a ratio capable of transmitting a predetermined maximum torque multiplication when re-acting on a stationary member of its supporting structure. Under such conditions, maximum relative motion between its component parts also takes place.

If, by suitable means interconnected with some of its elements, motion between these is prevented, such a gear set becomes locked or solid, and if, in that state, is permitted to run free of its reaction connecting with the stationary structure, is capable of transmitting drive shaft torque only, except for short periods and light reactions. The means referred to may be weights or masses, so arranged that under the general running motion of the gear set, inertia or centrifugal forces are induced, which tend to produce the desired locking effect.

The essential parts of the improved gear unit are driving and driven shafts connected by planetary gears and a one-way clutch for preventing the planet gears from backing up on the driven gear because of the load, and eccentric weights carried by the planet gears for the purpose of developing a centrifugal force to counterbalance the load stress and provide a floating variable fulcrum for the gear system so that it may drive the driven shaft at a speed comensurate with the lightness of the load and the speed of the drive shaft.

In the drawing, 1 and 2 are respectively the drive and driven shafts. The gear housing consisting of the elements 3 and 4 is fixed and provides additional bearings 5 and 6 for the shafts 1 and 2. The housing member 4 has an inspection and oil opening 7, closed by a cover plate 8.

The driven shaft 2 is shown as carrying an integral gear 9 and the right-hand end of shaft 1, Figure 1, has a running fit in a bushing 10, seated in gear 9.

The shaft 1 drives planet pinions 11 and 12 to cause the pinions to revolve bodily around the axis of the main shaft by means of pinion-carrying arm or spider 13 which is secured to shaft 1 by the clamp screw 14.

The pinions 11 and 12 are supported on shafts 15 which are preferably integral with one of their pinions, as indicated in Figure 1, and the shafts 15 have spaced bearings in the arm 13 which is of H-form. Thus a space 16 is provided in the arm 13 for accommodating eccentric weights 17 carried by shafts 15 and secured thereto by clamp screws 18.

The pinions 11 mesh with the sun gear 19 supported by but loose on shaft 1, and the pinions 12 mesh with gear 9 rigid with the driven shaft 2. Thus far described, there is no drive connection between shafts 1 and 2 as the planet gears are free to idly roll on the load-carrying gear 9; but since the pinions 11 are larger than pinions 12, the rolling of pinions 12 on the gear 9 causes a backward rotation of gear 19 meshing with the pinions 11 and the reaction gear 19 carries fast the cam, or clutch member 20, and the eccentric surfaces 21 thereof on backward rotation of the cam cause the balls or rollers 22 to grip the fixed clutch member 23 carried by the member 3 of the gear housing.

This housing, as previously explained, is fixed against rotation. At least that part of it which carries the clutch member 23 should prevent backward rotation of the clutch. Accordingly a positive drive relationship is afforded between the shafts 1 and 2. Upon rotation of shaft 1, pinions 11 must roll forwardly on the gear 19 and thus through the speed reduction afforded by the planet pinions rolling on their intermeshing gears and the pitch differences between these pinions and gears, the shaft 2 is positively driven at a comparatively slow speed with reference to shaft 1.

The rolling of the planet pinions on their gears is resisted by the centrifugal force developed around the main central axis of the unit. The eccentric weights 17 tend to stay in extreme radial position at high speed and drag reaction gear 9 free of the clutch upon development of a sufficiently large centrifugal force. This is possible when the work performed by the drive shaft becomes less upon acceleration of the driven shaft. Then according to the resistance of the driven shaft, the centrifugal force prevents turning of the planet pinions on their axes and an approach is made toward a one-to-one ratio between the drive and driven shafts forcing direct drive.

The direct drive relationship between these shafts is disturbed and the clutch again becomes effective; for example, by increase of the load on shaft 2 such as an increase in the percentage of lift with reference to horizontal travel. When the clutch is in engagement, the maximum speed reduction occurs.

The operation in starting a load from rest is the same as an increase of work performed under running conditions as above explained. The maximum reduction is in effect immediate because of the resistance of the load upon starting. Planetary gears tend to turn backwardly upon the driven gear 9 and thereby turn the clutch gear 19 backwardly sufficiently to engage the clutch which then forms the abutment around which the planet gears must roll and drive shaft 2.

Continuous accleration of shaft 1 produces continuous acceleration of shaft 2; even during the transition period some torque is transmittted to shaft 2. With two or more speeds available in this manner it is possible to accelerate heavy loads very economically.

In the assembly of my reduction gear for carrying maximum torque the eccentric weights must be arranged to reach their most outward position simultaneously. The centrifugal force rises or falls according to the rate of rotation of the unit and this in turn determines the amount of torque which can be transmitted with a locked condition of the planet gears.

Although but one specific embodiment of this invention is herein shown and described, it is to be understood that details as set forth may be altered or omitted without departing from the spirit of the invention as defined by the following claims:

I claim:

1. In an automatic transmission the combination of a drive shaft, a driven shaft, planetary gearing drivingly connecting said shafts, a supporting spider for said gearing fast on said drive shaft, a reaction gear rotatably mounted concentrically with said drive shaft, said planetary gears journaled on said spider, eccentric weights axially attached to said planetary gears whereby said weights affect the rotation of said planetary gears, a one-way clutch concentrically fixed on said reaction gear, and arranged to prevent reverse rotation of said reaction gear.

2. In an automatic transmission the combination of a drive shaft, a driven shaft, planetary gears drivingly connecting said shaft, a supporting spider for said gearing fast on said drive shaft, a reaction gear rotatably mounted concentrically with said drive shaft, said planetary gears journaled on said spider, eccentric weights axially attached to said planetary gears whereby said weights affect the roation of said planetary gears, a one-way clutch member concentrically fixed on said reaction gear, a stationary clutch member and clutch rollers interposed between said clutch members.

3. In an automatic transmission the combination of a drive shaft, a supporting spider fixed on said drive shaft, a reaction sun gear rotatably mounted concentric with said drive shaft, a driven shaft, a sun gear fixed on said driven shaft, planetary gears mounted on said spider and connecting said sun gears, eccentric weights axially attached to said planetary gears, and a one-way clutch coacting with said reaction gear whereby reverse rotation of said reaction gear is prevented.

4. In an automatic transmission the combination of a drive shaft, a driven shaft, planetary gears drivingly connecting said shafts, a supporting spider for said gears fast on said drive shaft, a reaction gear rotatably mounted concentrically with said drive shaft, said planetary gears journaled on said spider, eccentric weights axially attached to said planetary gears and arranged to simultaneously be equi-distant from the drive shaft, and a one-way clutch concentric with said reaction gear and acting to prevent reverse rotation of said reaction gear.

5. In a power transmission mechanism, the combination of a drive shaft, a reaction gear rotatably mounted on said drive shaft, a driven shaft, planetary gears connecting said shafts, a supporting spider fixed on the drive shaft for carrying said planetary gears, a plurality of centrifugal masses interconnected with said planetary gears and affecting the free action of said gearing, a clutch member arranged to prevent reverse rotation of said reaction gear, said clutch being capable of automatic release under direct drive.

6. In a power transmission mechanism, the combination of a drive shaft, a reaction gear rotatably mounted on said drive shaft, a driven shaft, planetary gears connecting said shafts, a supporting spider fixed on said drive shaft for carrying said planetary gears, a plurality of synchronized centrifugal masses interconnected with said planetary gears and simultaneously affecting the free action of said gearing, a clutch member arranged to prevent reverse rotation of said reaction gear, said clutch being capable of automatic release under direct drive.

RALPH M. GASTON.